United States Patent
Birman et al.

(10) Patent No.: US 9,499,097 B2
(45) Date of Patent: Nov. 22, 2016

(54) WING POINTER ILLUMINATION

(71) Applicant: Continental Automotive Systems, Inc., Auburn Hills, MI (US)

(72) Inventors: Vyacheslav Birman, Auburn Hills, MI (US); Arthur Brown, Sterling Heights, MI (US); Patrick Wang, Rochester Hills, MI (US); Richard Sanders, Clarkston, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 2 days.

(21) Appl. No.: 14/554,864

(22) Filed: Nov. 26, 2014

(65) Prior Publication Data
US 2015/0151676 A1    Jun. 4, 2015

Related U.S. Application Data

(60) Provisional application No. 61/910,471, filed on Dec. 2, 2013.

(51) Int. Cl.
| | |
|---|---|
| *G01D 11/28* | (2006.01) |
| *B60Q 3/04* | (2006.01) |
| *G01D 13/22* | (2006.01) |
| *B60K 37/02* | (2006.01) |
| *G01D 13/26* | (2006.01) |

(52) U.S. Cl.
CPC ............ *B60Q 3/044* (2013.01); *B60K 37/02* (2013.01); *G01D 13/22* (2013.01); *G01D 13/265* (2013.01)

(58) Field of Classification Search
CPC ........ B60Q 3/04; B60Q 3/044; B60K 37/02; G01D 13/22; G01D 13/265; G01D 13/28
USPC ............... 362/23.14, 23.21; 116/288
See application file for complete search history.

(56) References Cited

U.S. PATENT DOCUMENTS

| | | | | |
|---|---|---|---|---|
| 3,216,394 A | * | 11/1965 | Blackwell | G01D 11/28 |
| | | | | 116/288 |
| 4,218,726 A | | 8/1980 | Fukasawa et al. | |
| 5,173,682 A | | 12/1992 | Murphy et al. | |
| 5,983,827 A | * | 11/1999 | Cookingham et al. | G01D 11/28 |
| | | | | 362/23.21 |
| 6,189,480 B1 | * | 2/2001 | Staley et al. | G01D 11/28 |
| | | | | 116/288 |
| 6,955,438 B2 | | 10/2005 | Ishii | |
| 6,981,464 B2 | | 1/2006 | Birman et al. | |
| 7,191,730 B2 | | 3/2007 | Araki et al. | |
| 7,665,413 B2 | | 2/2010 | Birman et al. | |
| 7,721,672 B2 | | 5/2010 | Nakano et al. | |
| 8,225,736 B2 | | 7/2012 | Cook | |
| 2006/0039130 A1 | * | 2/2006 | Takatsuka et al. | B60K 37/02 |
| | | | | 362/23.13 |

FOREIGN PATENT DOCUMENTS

| | | |
|---|---|---|
| EP | 2666659 A1 | 11/2013 |
| JP | 201085113 A | 4/2010 |

* cited by examiner

*Primary Examiner* — Y M Lee

(57) ABSTRACT

A pointer arm for a gauge of a motor vehicle is provided. The pointer arm includes first and second light reflecting surfaces and an an arm portion extending from the first and second light reflecting surfaces. The pointer arm may be supported for rotation about an axis of rotation relative to a scale, and a shroud may be used to support the pointer arm. A cap may be supported on the pointer arm. The cap may include a pin extending into an opening within the pointer arm. The light reflecting surfaces are configured to propagate light around the opening and through the pointer arm.

10 Claims, 3 Drawing Sheets

WING POINTER ILLUMINATION

CROSS-REFERENCE TO RELATED APPLICATIONS

This application claims the benefit of U.S. Provisional Application No. 61/910,471 filed Dec. 2, 2013, the disclosure of which is hereby incorporated by reference in its entirety.

TECHNICAL FIELD

The present disclosure relates to vehicle instrument clusters and gauges, and more specifically to pointer for a vehicle instrument cluster and gauge that includes features for uniform illumination.

BACKGROUND

The background description provided herein is for the purpose of generally presenting a context of this disclosure. Work of the presently named inventors, to the extent it is described in this background section, as well as aspects of the description that may not otherwise qualify as prior art at the time of filing, are neither expressly nor impliedly admitted as prior art against the present disclosure.

Vehicles include instrument panels with several gauges and dials that communicate vehicle conditions such as speed, engine rpm, temperature, oil pressure along with many other operational parameters.

Each vehicle gauge includes a pointer that rotates about an axis to point to a specific graphic on the gauge dial to indicate a current vehicle operating parameter. Pointer assemblies can be illuminated. Light sources that are not orientated along the axis provide different amounts of light for each rotational position of the pointer assembly. Accordingly, the differing amounts of light potentially cause variation in pointer illumination relative to a position about the gauge surface. It is desirable to provide and develop pointer assemblies that provide substantially uniform illumination at any position about the axis relative to the dial gauge surface.

Accordingly, it is desirable to design and develop a pointer assembly and gauge that provides uniform illumination.

SUMMARY

A pointer arm is included that provides for a substantially uniform distribution of light along the pointer arm. A plurality of light reflecting surfaces offset from an axis of rotation are used to propagate light around a pin used to secure a cap in place on the pointer arm.

In one form, which may be combined with or separate from the other forms provided herein, a gauge assembly for a motor vehicle is provided. The gauge assembly includes a pointer arm supported for rotation about an axis of rotation relative to a scale and a shroud supporting the pointer arm. A cap is supported on the pointer arm. The cap includes a pin extending into an opening within the pointer arm. The pointer arm includes at least two reflecting surfaces configured to propagate light around the opening and through the pointer arm.

In another form, which may be combined with or separate from the other forms provided herein, a pointer arm for a gauge of a motor vehicle is provided. The pointer arm includes first and second curved light reflecting surfaces disposed adjacent to and contacting each other. An arm portion extends from the first and second light reflecting surfaces.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

BRIEF DESCRIPTION OF THE DRAWINGS

Examples are reflected in the drawings, which will be described below. The drawings described herein are for illustration purposes only and are not intended to limit the scope of the present disclosure in any way.

DETAILED DESCRIPTION

Figure 1:
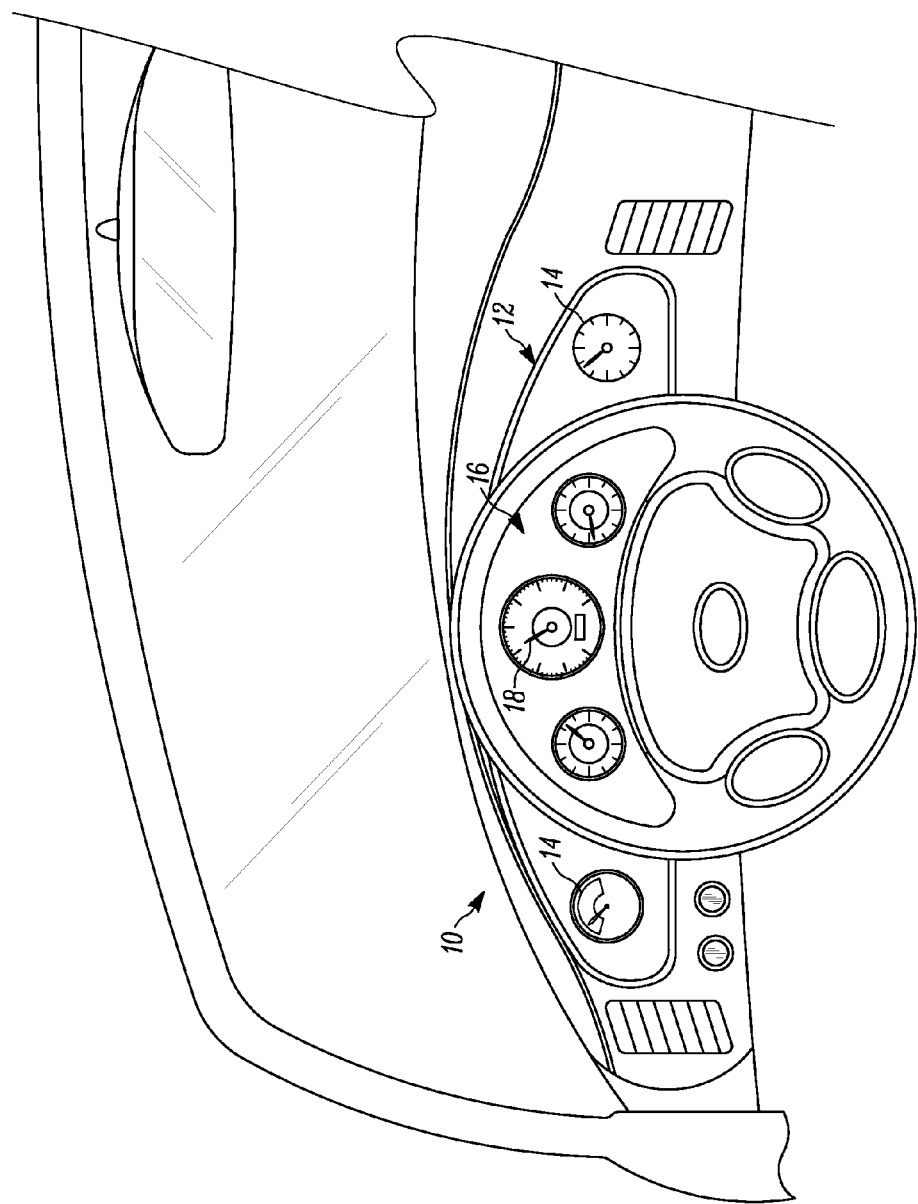
FIG. 1 is a schematic view of an example vehicle dashboard and instrument panel, in accordance with the principles of the present disclosure.
Figure 2:
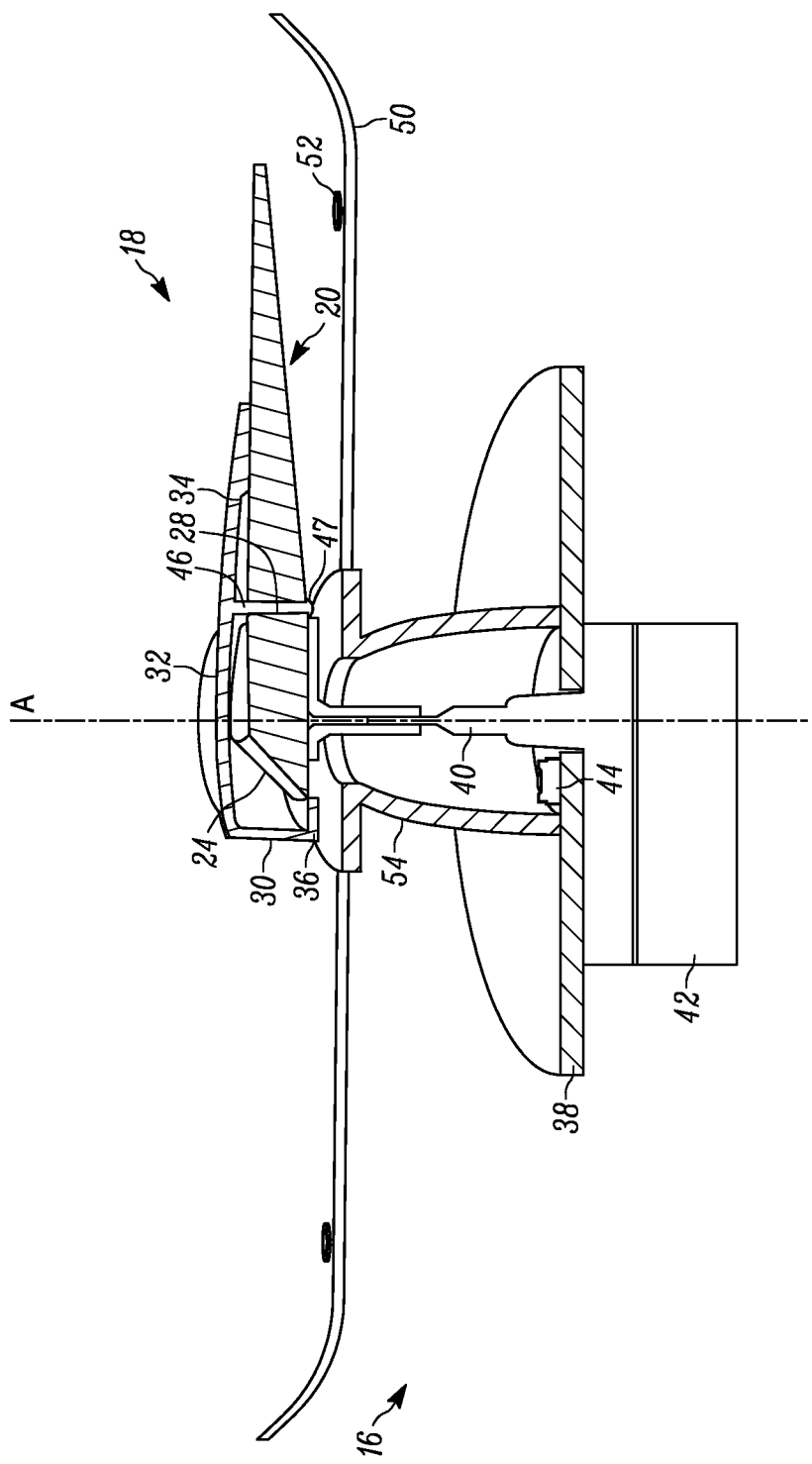
FIG. 2 is a cross-sectional view of an example gauge assembly of the instrument panel of FIG. 1, including a pointer assembly, according to the principles of the present disclosure.

The following description is merely exemplary in nature and is not intended to limit the present disclosure, application, or uses.

Certain terms are used throughout the following description and claims to refer to particular system components and configurations. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ".

Examples of the invention are described below. It should be noted that these and other examples or embodiments are exemplary and are intended to be illustrative of the invention rather than limiting. While the invention is widely applicable to different types of systems, it is impossible to include all of the possible embodiments and contexts of the invention in this disclosure. Upon reading this disclosure, many alternative embodiments of the present invention will be apparent to persons of ordinary skill in the art. Other embodiments may be utilized, and other changes may be made, without departing from the spirit or scope of the subject matter presented here.

Referring to the Figures, a vehicle dashboard 10 includes an instrument panel 12 including a main gauge 16 and several secondary gauges 14. The main gauge 16 includes a pointer assembly 18 that rotates about a gauge surface 50 to indicate a specific operating parameter on a gauge scale 52.

The example gauge assembly 16 includes the pointer assembly 18 that rotates about an axis A. The pointer assembly 18 is mounted to a shaft 40 that is driven by a stepper motor 42. The stepper motor 42 is mounted to a printed circuit board 38 and includes the shaft 40 that extends upwardly to support the pointer assembly 18. In this example, the stepper motor 42 is mounted to a back side of the printed circuit board 38. A light source 44 is mounted to a top side of the printed circuit board 38 and is disposed within a light housing 54. The light housing 54 surrounds the axis A and the shaft 40 and also provides space for a plurality of light sources 44. In this example, each of the light sources 44 comprises a light emitting diode (LED). The light housing 54 provides for the blocking or confinement of light as it propagates upward into the pointer assembly 18.

In this example, the pointer assembly 18 is illuminated by the light sources 44 that are disposed about the axis A and not along the axis A. Because the light sources 44 are disposed about the axis A, different rotational positions expose the pointer assembly 18 to different amounts of light. The example pointer assembly 18 is provided with features that reflect the light to provide for the substantially uniform distribution and propagation of light along the entire pointer assembly 18.

The example pointer assembly 18 includes a pointer arm 20 and a pointer cap 30 mounted to the pointer arm 20. The pointer arm 20 is supported on a shroud 36 that attaches to the shaft 40 of the stepper motor 42. The shroud 36 and pointer cap 30 are fabricated from material that does not transmit nor reflect light. The pointer arm 20 is fabricated from a translucent material that provides for the propagation of light throughout its entire surface.

The example pointer cap 30 includes a central portion 32 that is disposed about the axis of rotation A and an arm portion 34 that extends radially outward along a top surface of the pointer arm 20. The example pointer cap 30 includes a pin 46 that extends through an opening 28 of the pointer arm 20 to mount and maintain the cap 30 in a desired position. The pin 46 extends into the opening 28 defined within the pointer arm 20 and therefore partially blocks the passage of light transmitted through the pointer arm. The example pointer arm 20 includes a reflective surface 24 that accommodates the obstruction provided by the pin 46. The pin 46 may have a portion 47 extending completely through the opening 28 that is melted to fix the pin 46 and cap 30 in place with respect to the pointer arm 20.

The example pointer arm 20 includes the light reflecting surface 24 through which light is propagated from the light sources 44 disposed on the printed circuit board 38. Light propagates upward through the light housing 54 through an opening disposed about the axis of rotation A to allow light to enter the pointer arm 20. The pointer arm includes the light reflecting surfaces 24 that propagate light transverse to the axis of rotation A along the pointer arm 20 towards the pointer tip 26.

Figure 3:
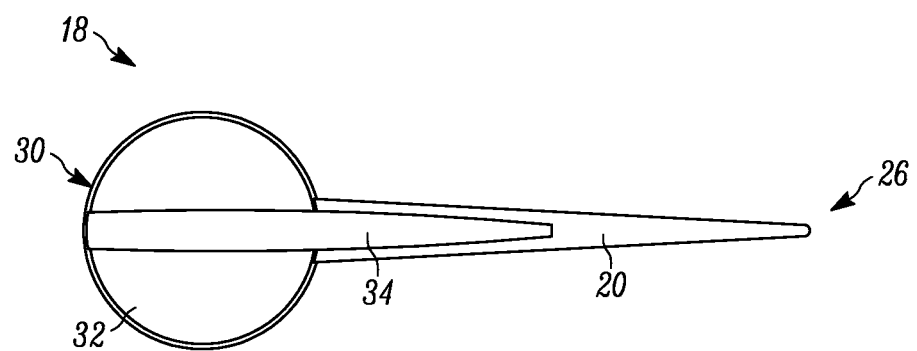
FIG. 3 is a top view of the example pointer assembly of FIG. 2, in accordance with the principles of the present disclosure.
Figure 4:
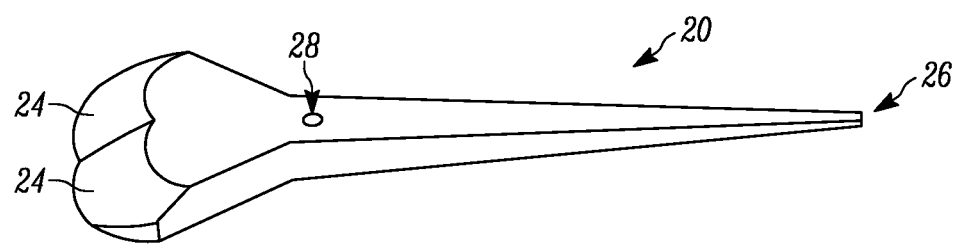
FIG. 4 is a perspective view of an example pointer arm of the pointer assembly of FIGS. 2-3, according to the principles of the present disclosure.

Referring to FIGS. 3 and 4, the example pointer assembly 18 is shown in a top view in FIG. 3 with the pointer cap 30 including the central portion 32 and the arm portion 34. Because the pointer cap 30 is mounted through the opening 28 within the pointer arm 20, light is divided between the two reflecting surfaces 24 to propagate light around the opening 28 to prevent the obstruction from generating a non-uniform illumination throughout the pointer arm 20. The example reflecting surfaces 24 are offset from the axis of rotation A such that light from the light source 44 is transmitted about the axis and reflected by the light reflecting surfaces 24. The two light reflecting surfaces 24 are curved and mirror images of each other to propagate light transverse to the axis of rotation A and around the opening 28 to provide a substantially uniform illumination of the pointer arm 20.

Accordingly, the example pointer assembly includes a pointer with features that accommodate both a mounting of a pointer cap and unique reflecting surfaces that direct light around the gap or blocking opening used to mount the pointer cap and provide substantially uniform illumination of the pointer arm.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A gauge assembly for a motor vehicle comprising:
    a pointer arm supported for rotation about an axis of rotation relative to a scale;
    a shroud supporting the pointer arm;
    a cap supported on the pointer arm, the cap including a pin extending into an opening within the pointer arm, wherein the pointer arm includes at least two reflecting surfaces configured to propagate light around the opening and through the pointer arm, wherein each of the reflecting surfaces has a curved shape, wherein the two reflecting surfaces are mirror images of each other, wherein each reflecting surface is offset from the axis of rotation, the reflecting surfaces including a first reflecting surface and a second reflecting surface, the first reflecting surface disposed adjacent to and contacting the second reflecting surface, the cap comprising a central portion and an arm portion extending radially outward from the central portion along the pointer arm, the central portion being disposed about the axis of rotation.

2. The gauge assembly of claim 1, further comprising at least one light source offset from the axis of rotation, the light source being configured to provide light to the reflecting surfaces.

3. The gauge assembly of claim 2, further comprising a printed circuit board, the at least one light source being disposed on the printed circuit board, the gauge assembly further comprising a stepper motor mounted to the printed circuit board, the stepper motor having a shaft connected to the shroud.

4. The gauge assembly of claim 3, further comprising a light housing, the light source being disposed within the light housing, the light housing surrounding the axis of rotation.

5. A pointer for a gauge of a motor vehicle, the pointer comprising:
    first and second curved light reflecting surfaces disposed adjacent to and contacting each other;
    an arm extending from the first and second light reflecting surfaces; and
    a cap supported on the arm, the cap including a pin extending into an opening within the arm, the first and second light reflecting surfaces being configured to propagate light around the opening and through the arm to a pointer tip.

6. The pointer of claim 5, wherein the first and second light reflecting surfaces are mirror images of each other.

7. A pointer for a gauge of a motor vehicle, the pointer comprising:

first and second curved light reflecting surfaces disposed adjacent to and contacting each other, wherein the first and second light reflecting surfaces are mirror images of each other;

an arm extending from the first and second light reflecting surfaces; and a cap supported on the arm, the cap including a pin extending into an opening within the arm, the first and second light reflecting surfaces being configured to propagate light around the opening and through the arm to a pointer tip.

8. The pointer of claim 7, further comprising a shroud connected to the arm, the shroud having a portion configured to be supported about an axis of rotation of the pointer.

9. The pointer of claim 8, each light reflecting surface being offset from the axis of rotation.

10. The pointer of claim 9, the cap comprising a central portion and a cap arm extending radially outward from the central portion along the arm, the central portion being disposed about the axis of rotation.

* * * * *